United States Patent Office 3,356,758
Patented Dec. 5, 1967

3,356,758
SILOXANE-OXYALKYLENE BLOCK COPOLYMERS AND PROCESS THEREFOR
George M. Omietanski, Tonawanda, and Wallace G. Reid, Grand Island, N.Y., assignors to Union Carbide Corporation, a corporation of New York
No Drawing. Filed Aug. 7, 1963, Ser. No. 300,644
13 Claims. (Cl. 260—824)

This invention relates to a process for preparing block copolymers containing at least one siloxane polymer and at least one oxyalkylene polymer in combination and to certain novel block copolymer compositions of matter prepared thereby. More specifically, it relates to a process of heating acyloxysiloxanes with polyoxyalkylene hydroxyl polymers and removing carboxylic acid from the reaction mixture.

Siloxane-oxyalkylene block copolymers containing an Si—O—C linkage between the siloxane polymer and the oxyalkylene polymer are known in the art. Such block copolymers, as for example those described in U.S. 2,834,748 and 2,917,480, are well known to be useful as emulsifying agents for hydrocarbon-water systems and as stabilizers for polyurethane foam. These block copolymers are usually prepared by reaction between alkoxy end-blocked siloxanes and polyoxyalkylene mono-ols or diols in the presence of a mutual solvent and a catalyst. Solvents such as toluene or xylene and catalysts such as trifluoroacetic acid or potassium silanolate are frequently used. This prior art reaction had the disadvantages of requiring large amounts of mutual solvent, extensive reaction times, neutralization of catalyst, desolvation, and removal of neutralized catalyst residues.

It has now been found that siloxane-oxyalkylene block copolymers can be conveniently prepared without the use of solvent or catalyst by heating (1) an organosilicon polymer containing at least one acyloxy radical attached to a silicon atom having a silicon functionality of from 2 to 4 inclusive and (2) a polyoxyalkylene hydroxyl polymer composed of at least two oxyalkylene groups, and removing a carboxylic acid corresponding to the acyl groups of the siloxane polymer from the reaction mixture. The preferred organosilicon polymer starting materials are selected from the class consisting of acyloxy organosilicon polymers having the formulas:

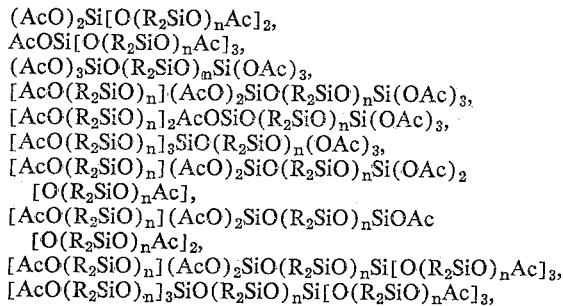

wherein R is a hydrocarbyl radical, Ac is an acyl radical, $n$ is a number having a value of at least 2, $a$, $b$, $c$, $d$, $e$ and $f$ are 0 or an integer having a value of 1 to 3 inclusive, the sum of $a+b+c$ is 3, the sum of $d+e+f$ is 3 and at least one member of the class consisting of $b$, $c$, $e$ and $f$ is an integer having a value of 1 to 3 inclusive, $x$ and $y$ are 0, 1 or 2, $w$ is 2 or 3, and the sum of $x+y+w$ is 4.

Illustrative compounds included within the above formulas which are useful in the present invention are:

$R_3SiO(R_2SiO)_nSiR(OAc)_2$,
$(AcO)_2SiRO(R_2SiO)_nSiR(OAc)_2$,
$AcO(R_2SiO)_nAc$,
$R_3SiO(R_2SiO)_nAc$,
$RSi[O(R_2SiO)_nAc]_3$,
$(AcO)_2SiRO(R_2SiO)_nAc$,
$AcOSiR[O(R_2SiO)_nAc]_2$,
$(AcO)_3SiO(R_2SiO)_nAc$,
$(AcO)_2Si[O(R_2SiO)_nAc]_2$,
$AcOSi[O(R_2SiO)_nAc]_3$,
$(AcO)_3SiO(R_2SiO)_nSi(OAc)_3$,
$[AcO(R_2SiO)_n](AcO)_2SiO(R_2SiO)_nSi(OAc)_3$,
$[AcO(R_2SiO)_n]_2AcOSiO(R_2SiO)_nSi(OAc)_3$,
$[AcO(R_2SiO)_n]_3SiO(R_2SiO)_n(OAc)_3$,
$[AcO(R_2SiO)_n](AcO)_2SiO(R_2SiO)_nSi(OAc)_2$
   $[O(R_2SiO)_nAc]$,
$[AcO(R_2SiO)_n](AcO)_2SiO(R_2SiO)_nSiOAc$
   $[O(R_2SiO)_nAc]_2$,
$[AcO(R_2SiO)_n](AcO)_2SiO(R_2SiO)_nSi[O(R_2SiO)_nAc]_3$,
$[AcO(R_2SiO)_n]_3SiO(R_2SiO)_nSi[O(R_2SiO)_nAc]_3$, and the like.

The hydrocarbyl radicals which are represented by R in the above formulas are illustrated by alkyl groups, such as methyl, ethyl, propyl, isopropyl, butyl, isobutyl, amyl, hexyl and the like; alkenyl groups, such as vinyl, allyl and the like; alicyclic groups, such as cyclopentyl, cyclohexyl and the like; aryl groups, such as phenyl, naphthyl and the like; aralkyl groups, such as benzyl, phenylethyl and the like; and alkaryl groups, such as tolyl, ethylphenyl, xylyl, mesityl and the like. R is preferably an alkyl group, such as methyl.

In the above formulas, R need not be the same radical throughout the molecule. Using the formula $$R_3SiO(R_2SiO)_nSiR(OAc)_2$$

as an example, materials such as $$Me_3SiO(Me_2SiO)_nSiMe(OAc)_2$$

$$Me_3SiO(Et_2SiO)_nSiBu(OAc)_2$$

$$Me_3SiO(Me_2SiO)_g(Et_2SiO)_hSiVi(OAc)_2$$

and the like can be used, wherein Me represents a methyl radical, Et represents an ethyl radical, Bu represents a butyl radical, Vi represents a vinyl radical, and $g$ and $h$ are numbers having a total of at least 2. In the compounds having at least two acyloxy groups attached to a single silicon atom, such as those represented by formulas $$R_3SiO(R_2SiO)_nSiR(OAc)_2$$

and $$(AcO)_2SiRO(R_2SiO)_nSiR(OAc)_2$$

the $(R_2SiO)_n$ portion of the compound can have a molecular weight as high as 50,000 or higher, but it is preferred that this portion of the siloxane compound have a molecular weight of from about 400 to about 10,000. In the compounds having only one acyloxy group attached to a single silicon atom, such as those represented by formulas $$AcO(R_2SiO)_nAc$$

and $$R_3SiO(R_2SiO)_nAc$$

the $(R_2SiO)_n$ portion of the compound should have a molecular weight of from about 200 to about 800.

The acyl radicals which are represented by Ac in the above formulas are illustrated to formyl, acetyl, propionyl, butyryl, trimethylacetyl, isobutyryl and the like. It is preferred that Ac be an acyl radical that forms a carboxylic acid having an atmospheric boiling point of less than about 170° C. Such acyl radicals are formyl, acetyl, propionyl, trimethylacetyl, isobutyryl and the like. Different acyl radicals can also be present in the same molecule. The above-described acyloxysiloxanes are prepared by well known processes, such as those described in U.S. 2,910,496; 3,035,016 and British 899,938, for example.

The polyoxyalkylene hydroxyl polymers employed in the process of the present invention comprise the well-known monohydroxy-polyoxyalkylene monoethers and polyoxyalkylene diols containing the polymeric unit $(C_kH_{2k}O)_m$ wherein $k$ is an integer from 2 to 4 inclusive and $m$ is a number having a value of at least 2. The polymeric unit of the monohydroxy polyoxyalkylene monoethers is endblocked on one end by an alkoxy group and on the other end by a hydroxyl group. The polymeric unit of the polyoxyalkylene diols is endblocked on both ends by hydroxyl groups. Compounds wherein the $(C_kH_{2k}O)_m$ unit has a molecular weight up to about 10,000 or higher can be used. Compounds wherein the $(C_kH_{2k}O)_m$ unit has a molecular weight of from about 200 to about 6000 are preferred. The oxyalkylene group need not be the same throughout the molecule and can comprise oxyalkylene groups of different composition, such as oxyethylene, oxy-1,2-propylene, oxy-1,3-propylene, oxybutylene and the like. Monohydroxy polyoxypropylene monoethers suitable for the practice of this invention are described in U.S. 2,448,664. Monohydroxy oxyethylene-oxy-1,2-propylene monoethers having both oxyethylene and oxypropylene groups in the molecule are described in U.S. 2,425,755. The polyoxyalkylene diols employed in the present invention are the well known polyoxyethylene glycols, polyoxypropylene glycols and polyoxybutylene glycols as well as the poyoxyethylene-polyoxypropylene diols described in U.S. 2,425,845. Other oxyalkylene diols may be formed by the addition of ethylene oxide to polyoxypropylene glycol or of propylene oxide to polyoxyethylene glycol. It is also known that polyoxyalkylene mono-ol polymers can be made by reacting alkylene oxides with other compounds having a labile hydrogen atom. Examples of such compounds are alkyl and aryl mercaptans such as ethyl and butyl mercaptans and alkyl and aryl amines, such as mono-butyl and dibutylamine and aniline. Such monohydroxy polyoxyalkylene polymers made from such diverse starting materials also are useful in the present invention since the starting fragment of the polyoxyalkylene polymer forms an insignificant fraction of the final block copolymer product.

In the process of the present invention an acyloxy group of the acyloxysiloxane reacts with a hydroxyl group of the polyoxyalkylene hydroxyl polymer to form a siloxane-oxyalkylene block copolymer and a carboxylic acid. Various types of block copolymer products can result from this process depending upon the specific reactants employed and the mole ratio between the reactants. For example, when a monoacyloxy silane of the type

is reacted with a monohydroxy polyoxyalkylene monoether, the resulting block copolymer will consist of a

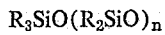

group attached to a polyoxyalkylene monoether group through a Si—O—C linkage. When a monoacyloxy siloxane is reacted with a polyoxyalkylene diol in equimolar quantities, the resulting block copolymer will consist primarily of a siloxane group attached to a polyoxyalkylene group endblocked with a hydroxyl group. If two moles of monoacyloxysiloxane are used for each mole of polyoxyalkylene diol, the final block copolymer will consist primarily of a polyoxyalkylene group connected on each end to a siloxane group. The polyacyloxysiloxane reactants employed in the present invention allow even more flexibility in the preparation of block copolymers. As is apparent to one skilled in the art, the present invention enables a large number of block copolymer compositions to be conveniently prepared without the necessity of using solvents and catalysts.

The acyloxy radicals in the starting materials having the formulas

and

are of equal reactivity. The acyloxy radicals in the starting materials having at least two acyloxy groups attached to a single silicon atom, such as those having the formulas

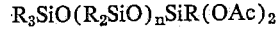
and
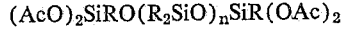

show a selectivity in their reactions with polyoxyalkylene hydroxy polymers. Thus, reaction of one mole of

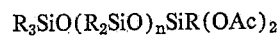

material with one mole of polyoxyalkylene mono-ol yields a block copolymer with the following structure:

This latter block copolymer can then be further reacted with another mole of the same or different polyoxyalkylene mono-ol to form a block copolymer of the formula:

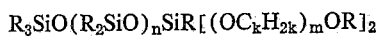

Similarly, the reaction of one mole of

with two moles of polyoxyalkylene mono-ol yields a block copolymer with the following structure:

This acyloxy containing block copolymer can then be reacted with another two moles of the same or different polyoxyalkylene mono-ol to form a block copolymer of the formula:

If less than the stoichiometric quantities of acyloxysiloxane or oxyalkylene polymer are employed, the resulting block copolymer product can contain acyloxy and/or hydroxyl groups. Such product is useful as an intermediate for reaction with other compounds through such acyloxy and/or hydroxyl groups. Where the block copolymer is not to be used as an intermediate, it is preferred that the acyloxy and/or hydroxyl content be as low as possible and that stoichiometric quantities of reactants be employed.

The thermal condensation reactions of acyloxy endblocked siloxanes with polyoxyalkylene hydroxy polymers for forming block copolymers are essentially reversible and are dependent upon the removal of the carboxylic acid products from the reaction mixture in order to force the reactions to completion. Rapid removal of the acid product is also desirable in order to prevent undesirable side reactions with the polyoxyalkylene hydroxy polymers. These undesirable side reactions can result in the formation of water which can cause hydrolysis and other undesirable reactions with the acyloxy endblocked siloxanes. The quantity of carboxylic acid product removed from each reaction mixture provides an indication of the extent to which that particular condensation reaction between the acyloxypolysiloxane and the polyoxyalkyiene glycols or mono-ol reactants has reached completion. The rate at which the carboxylic acid product is removed from the reaction mixture additionally serves to indicate the rate at which the reaction is progressing. That is, if a large quantity of carboxylic acid product is removed within a short period of reaction time, it may be concluded that the reaction is proceeding at a rapid rate, while the reaction is probably proceeding at a somewhat slower rate if the amount of carboxylic acid product removed in the given time is relatively small.

The reaction conditions for carrying out the process of this invention are not narrowly critical. The reaction temperature can be from about 75° C. to about 200° C. At reaction temperatures below about 75° C. the reaction time is unduly long. At reaction temperatures above about 200° C. the acyloxypolysiloxane reactant material tends to undergo decomposition. It is preferred that the process be conducted at the boiling point of the carboxylic acid product so that it can be rapidly removed from the reaction mixture. At atmospheric pressure the preferred reaction temperature is from about 100° C. to about 170° C. Reaction pressures above or below atmospheric can be employed if desired. It is also preferred to have an inert gas passing through the reaction mixture to provide agitation and also to help sweep by-product carboxylic acid from the reaction system.

Several novel block copolymer compositions of matter have been prepared by the above described process. These novel materials have the formulas:

$$[RO(C_kH_{2k}O)_m]_2SiRO(R_2SiO)_nSiR[(OC_kH_{2k})_mOR]_2$$

and $$R_3SiO(R_2SiO)_nSiR[(OC_kH_{2k})_mOR]_2$$

wherein R, k, m, and n are defined above. In these compounds the R groups can be the same or different throughout the molecule and the $(C_kH_{2k}O)$ groups can be the same or different throughout the molecule. These novel compositions of matter are useful as emulsifying agents for hydrocarbon-water systems and as stabilizing agents for polyurethane foams.

The process and compositions of the present invention are further described in the following examples. In these examples Ac represents an acetyl radical ($CH_3CO$).

EXAMPLE I

Block copolymer from $Me_3SiO(Me_2SiO)_6Ac$ (M.W. 576) and a polyoxyethylene-oxypropylene monoalkyl ether (av. M.W. 1650)

About 20 grams of a monobutyl ether of a polyalkylene glycol containing 50 weight percent ethylene oxide units and 50 weight percent propylene oxide units and having an average molecular weight of about 1650

[formula about $BuO(C_2H_4O)_{19}(C_3H_6O)_{14}H$]

were heated together with 7.6 grams (10% excess) of $$Me_3SiO(Me_2SiO)_6Ac$$

Approximately equimolar quantities of reactants were used. The following heating schedule was used.

| Time, hrs. | Temperature, °C. | Pressure, mm. mercury |
|---|---|---|
| 2 | 100 | 10 |
| 2 | 150 | 20 |
| 1 | 150 | 5 |
| 5.5 | 150 | 10 |
| 1 | 150–160 | 0.1 |

A total of 2.1 g. of distillate (identified by infrared spectroscopy analysis as containing acetic acid) and 24.6 g. of block copolymer was obtained. The block copolymer had the following properties:

| | |
|---|---|
| Refractive index, $n_D^{25}$ | 1.4458 |
| Viscosity at 25° C. cps | 290 |
| Wt. percent OH | 0.4 |
| Wt. percent AcO | 0.330 |
| Wt. percent Si | 6.7 |
| Surface tension dynes/cm. | 23.0 |

This block copolymer was soluble in water and emulsified a benzene-water mixture.

EXAMPLE II

Block copolymer from $Me_3SiO(Me_2SiO)_6Ac$ (M.W. 576) and a polyoxyethylene-oxypropylene monoalkyl ether (av. M.W. 3150)

About 20 grams of a monobutyl ether of a polyakylene glycol containing 50 weight percent ethylene oxide units and 50 weight percent propylene oxide units and having an average molecular weight of about 3150

[formula about $BuO(C_2H_4O)_{36}(C_3H_6O)_{27}H$]

were heated together with 5.68 g. (10% excess) of $$Me_3SiO(Me_2SiO)_6Ac$$

for 2 hours at 150° C./5 mm. and 3 hours at 160° C./3 mm. Approximately equimolar quantities of reactants were used. This reaction resulted in 23.3 g. of block copolymer product together with 1.86 g. of an acidic distillate.

The block copolymer had the following properties:

| | |
|---|---|
| Refractive index, $n_D^{25}$ | 1.4562 |
| Viscosity at 25° C. cps | 1000.0 |
| Wt. percent OH | 0.3 |
| Wt. percent AcO | 0.68 |
| Wt. percent Si | 5.1 |

This block copolymer was water soluble and emulsified a benzene-water mixture.

EXAMPLE III

Block copolymer from $Me_3SiO(Me_2SiO)_6Ac$ (M.W. 576) and a polyoxyethylene-oxypropylene monoalkyl ether (av. M.W. 236)

About 10 grams of a monobutyl ether of a polyalkylene glycol containing 50 weight percent ethylene oxide units and 50 weight percent propylene oxide units and having an average molecular weight of about 236

[formula about $BuO(C_2H_4O)_{2.7}(C_3H_6O)_{2.0}H$]

were heated together with 25 g. (10% excess) of $$Me_3SiO(Me_2SiO)_6Ac$$

for 2 hours at 150° C./10–2 mm. and 3 hours at 150° C./0.3 mm. Approximately equimolar quantities of reactants were used. This reaction resulted in 23.4 g. of block copolymer product together with 9.2 g. of an acidic distillate. The block copolymer had the following properties:

| | |
|---|---|
| Refractive index, $n_D^{25}$ | 1.4145 |
| Viscosity at 25° C. cps | 16.0 |
| Wt. percent OH | 0.15 |
| Wt. percent Si | 24.1 |

This block copolymer was partially soluble in water and stabilized a polyurethane foam.

EXAMPLE IV

Block copolymer from $Me_3SiO(Me_2SiO)_9Ac$ (M.W. 798) and a polyoxyethylene-oxypropylene monoalkyl ether (av. M.W. 1650)

About 20 grams of a polyoxyalkylene mono-ol described in Example I above were heated with 8.7 g. (2% excess) of $$Me_3SiO(Me_2SiO)_9Ac$$

for 2 hours at 150° C./5 mm. followed by 3 hours at 150° C./0.3 mm. Approximately equimolar quantities of reactants were used. The block copolymeric product (28.1 g.) had the following properties:

| | |
|---|---|
| Refractive index, $n_D^{25}$ | 1.4420 |
| Viscosity at 25° C. cps | 287 |
| Wt. percent OH | 0.5 |
| Wt. percent AcO | 0.78 |
| Wt. percent Si | 10.1 |

The block copolymer product was water soluble, promoted the formation of a stable water-benzene emulsion, and stabilized a polyurethane foam composition.

EXAMPLE V

Block copolymer from $Me_3SiO(Me_2SiO)_3Ac$ (M.W. 354) and a polyoxyethylene-oxypropylene monoalkyl ether (av. M.W. 236)

About 10 grams of a polyoxyalkylene mono-ol described in Example III above were heated with 16.5 g. (10% excess) of $$Me_3SiO(Me_2SiO)_3Ac$$

at 150° C. for 5 hours. Approximately equimolar quantities of reactants were used. Fractionation of the product resulted in 9.0 g. of a block copolymer having the following properties:

| | |
|---|---|
| Refractive index, $n_D^{25}$ | 1.4165 |
| Boiling point (0.2 mm. Hg) | 140–145° C. |
| Wt. percent OH | 0.21 |
| Wt. percent AcO | 0.37 |
| Wt. percent Si | 20.3 |

This block copolymer product was water soluble and lowered the surface tension of the water solution.

EXAMPLE VI

Block copolymer from $AcO(Me_2SiO)_8Ac$ (M.W. 694) and a polyoxyethylene-oxypropylene monoalkyl ether (av. M.W. 1650)

About 20 grams of a polyoxyalkylene mono-ol described in Example I above were heated with 4.35 g. (10% excess) of $$AcO(Me_2SiO)_8Ac$$

for 2 hours at 160° C./5 mm. Hg followed by 3 hours at 160° C./0.3 mm. Hg. Approximately two moles of the polyoxyalkylene mono-ol were used for each mole of the acyloxysiloxane. The block copolymeric product (23.6 g.) has the following properties:

| | |
|---|---|
| Refractive index, $n_D^{25}$ | 1.4497 |
| Viscosity at 25° C. cps | 585 |
| Wt. percent OH | 2.9 |
| Wt. percent AcO | 0.95 |
| Wt. percent Si | 5.7 |

The block copolymer product was water soluble and it promoted the formation of a stable water-benzene emulsion.

EXAMPLE VII

Block copolymer from $AcO(Me_2SiO)_9Ac$ (M.W. 768) and a polypropylene glycol (av. M.W. 2000)

(a) A solution of 2.2 g. of $$AcO(Me_2SiO)_9Ac$$

in 250 g. of a polypropylene glycol having an average molecular weight of 2000

[formula about $HO(C_3H_6O)_{34}H$]

was heated for 3 hours at 120–125° C. using a dry nitrogen sparge. Approximately 42 moles of glycol were used for each mole of siloxane. A clear block copolymer of 350 cps. viscosity at 25° C. was obtained.

(b) The above preparation was repeated using 4.4 g. of $$AcO(Me_2SiO)_9Ac$$

in 250 g. of the above glycol. Approximately 21 moles of glycol were used for each mole of siloxane. A clear block copolymer of 340 cps. viscosity at 25° C. was obtained.

(c) The above preparation was repeated using 8.8 g. of $$AcO(Me_2SiO)_9Ac$$

in 250 g. of the above glycol. Approximately 11 moles of glycol were used for each mole of siloxane. A clear block copolymer of 360 cps. viscosity at 25° C. was obtained.

Useful block copolymers can be obtained from the above reactants of Example VII in the range of about 2 to about 44 moles of glycol for each mole of siloxane.

EXAMPLE VIII

Block copolymers from
$(AcO)_2SiMeO(Me_2SiO)_nSiMe(OAc)_2$
and polyoxyethylene-oxypropylene monoalkyl ethers (a) About 110 grams of a polyoxyalkylene mono-ol described in Example I above were heated with 38.6 g. of $$(AcO)_2SiMeO(Me_2SiO)_{28.4}SiMe(OAc)_2$$

for 3 hours at 140–145° C. using a nitrogen sparge to remove by-product acetic acid. Approximately four moles of polyoxyalkylene mono-ol were used for each mole of acyloxysiloxane. The resulting block copolymer had a viscosity of 13,200 cps. at 25° C., was water-soluble, and a 1 weight percent solution in water had a cloud-point of 38–41° C. This block copolymer was useful to stabilize a polyurethane foam composition.

(b) A repetition of the above preparation at a lower temperature (120° C.) for a longer reaction time (6 hours) produced a water-soluble block copolymer surfactant having a viscosity of 16,400 cps. at 25° C. This block copolymer also stabilized a polyurethane foam composition.

EXAMPLE IX

Block copolymer from
$(AcO)_2SiMeO(Me_2SiO)_nSiMe(OAc)_2$
and polyoxyethylene-oxypropylene monoalkylether About 85 grams of a polyoxyalkylene mono-ol described in Example I above were heated with 37.6 g. of $$(AcO)_2SiMeO(Me_2SiO)_{28.4}SiMe(OAc)_2$$

for 5 hours at 120° C. using a dry nitrogen sparge to remove by-product acetic acid. Approximately 3.3 moles of polyoxyalkylene mono-ol were used for each mole of acyloxysiloxane. The resulting clear block copolymer which contained some unreacted acyloxy groups was water-soluble, had a viscosity of 13,200 cps. at 25° C. and stabilized a polyurethane foam composition.

EXAMPLE X

Block copolymer from
$(AcO)_2SiMeO(Me_2SiO)_nSiMe(OAc)_2$
and polyoxyethylene-oxypropylene monoalkyl ether A 61.2 gram quantity of a monobutyl ether of a polyalkylene glycol containing 50 weight percent ethylene oxide units and 50 weight percent propylene oxide units and having an average molecular weight of about 950

[formula about $BuO(C_2H_4O)_{11}(C_3H_6O)_8H$]

was heated with 38.6 g. of $$(AcO)_2SiMeO(Me_2SiO)_{28.4}SiMe(OAc)_2$$

for 3 hours at 120° C. Approximately four moles of polyoxyalkylene mono-ol were used for each mole of acyloxysiloxane. The resulting clear block copolymer was water-soluble and had a viscosity of 850 cps. at 25° C.

EXAMPLE XI

Block copolymer from
$(AcO)_2SiMeO(Me_2SiO)_nSiMe(OAc)_2$
and polyoxyethylene-oxypropylene monoalkyl ether Heating a solution of 16.9 g. of $$(AcO)_2SiMeO(Me_2SiO)_3SiMe(OAc)_2$$

in 122.4 g. of a polyoxyalkylene mono-ol described in Example X above for 4.5 hours at 120° C., using a nitrogen sparge, gave a block copolymer having a viscosity of 400 cps. at 25° C. Approximately four moles of oxyalkylene mono-ol were used for each mole of acyloxysiloxane.

EXAMPLE XII

*Block copolymer from*
$(AcO)_2SiMeO(Me_2SiO)_nSiMe(OAc)_2$
*and polyoxyethylene-oxypropylene monoalkyl ether*

Heating a mixture of 28.4 g. of $(AcO)_2SiMeO(Me_2SiO)_{10.7}SiMe(OAc)_2$ in 100 g. of a polyoxyalkylene mono-ol described in Example X above for 3 hours at 120° C. gave a slightly turbid block copolymer having a viscosity of 440 cps. at 25° C. The copolymer was water-soluble and a 1 weight percent solution in water had a cloud point of 24–25° C. Approximately four moles of oxyalkylene mono-ol were used for each mole of acyloxysiloxane.

EXAMPLE XIII

*Block copolymer from*
$(AcO)_2SiMeO(Me_2SiO)_nSiMe(OAc)_2$
*and polyoxyethylene-oxypropylene monoalkyl ether*

To a 500 ml., 3-necked flask equipped with a stirrer, temperature controller, nitrogen sparge tube and condenser was charged a 22.0 g. quantity of a monomethyl ether of a polyethylene glycol having an average molecular weight of about 750

[formula about $MeO(C_2H_4O)_{17}H$]

and 38.6 g. of $(AcO)_2SiMeO(Me_2SiO)_{28.4}SiMe(OAc)_2$

Approximately two moles of the oxyalkylene mono-ol were used for each mole of acyloxysiloxane. This initially incompatible mixture was heated at 120° C. for 4 hours. During this time the mixture became compatible and acetic acid was no longer evolved. Then, a 50 g. quantity of polyoxyalkylene mono-ol described in Example I above was added and the mixture was heated for another 4 hours at 120° C. Approximately two moles of this latter oxyalkylene mono-ol were used for each mole of acyloxysiloxane originally charged. The resulting block copolymer was turbid and had a viscosity of 23,000 cps. at 25° C. This product stabilized a polyurethane foam composition. The product had a structure represented by the approximate formula:

$[MeO(C_2H_4O)_{17}][BuO(C_2H_4O)_{19}(C_3H_6O)_{14}]SiMeO$
$(Me_2SiO)_{28.4}SiMe[(OC_2H_4)_{19}(OC_3H_6)_{14}OBu]$
$[(OCH_4)_{17}OMe]$

EXAMPLE XIV

*Block copolymer from $Me_3SiO(Me_2SiO)_3SiVi(OAc)_2$
(M.W. 484) and a polyoxyethylene-oxypropylene monoalkylether (av. M.W. 1650)*

A solution of 12.1 g. of $Me_3SiO(Me_2SiO)_3SiVi(OAc)_2$ in 100 g. of a polyoxyalkylene mono-ol described in Example I above was heated at 120° C. for 2.5 hours. There was obtained a clear water-soluble block copolymer having a viscosity of 350 cps. at 25° C. Approximately two moles of oxyalkylene mono-ol were used for each mole of acyloxysiloxane. The block copolymer product has a structure represented by the approximate formula:

$Me_3SiO(Me_2SiO)_3SiVi[(OC_2H_4)_{19}(OC_3H_6)_{14}OBu]_2$

The siloxane-oxyalkylene block copolymers produced according to the present invention are useful as stabilizers for polyurethane foam compositions. This is shown by the data of the following example.

EXAMPLE XV

*Evaluation of block copolymers as polyurethane foam stabilizers*

The polyurethane foam compositions employed in this evaluation were well-known two component systems. The components A and B consisted of:

| A | Weight, parts |
|---|---|
| Oxyalkylene polyol (a 50:50 weight percent mixture of a polypropylene glycol of about 2000 molecular weight and a glycerol started polypropylene triol of about 3000 molecular weight) | 450.0 |
| Water | 4.0 |
| Triethylamine | 0.3 |
| Siloxane-oxyalkylene block copolymer | 0.93–18.75 |
| Dibutyltin dilaurate | 3.0 |

B

| | |
|---|---|
| Toluene diisocyanate | 165.5 |

Urethane foams were prepared by rapidly adding B to mixture A, which was well stirred. The results of these evaluations are given in the following table. The siloxane-oxyalkylene block copolymer used in each evaluation is identified by the above example numbers wherein the preparation is described.

TABLE
*Evaluation of siloxane-oxyalkylene block copolymers as polyurethane foam stabilizers*

| Copolymer Example | Weight Percent Siloxane in Block Copolymer | Copolymer Viscosity, cps. at 25° C. | Polyurethane Foam Performance Data |
|---|---|---|---|
| III | 69 | 16 | 8-in. rise, very coarse, closed cells. |
| IV | 31 | 287 | 7.5-in- rise, coarse, closed cells. |
| VIII(a) | 24 | 13,200 | 6.9-in. rise, good uniformity, 35 cells/inch. |
| VIII(b) | 24 | 16,400 | 6.2-in. rise, good uniformity, 45–50 cells/inch. |
| IX | 27 | 13,200 | 7-in. rise, good uniformity, 45–50 cells/inch. |
| XIII | 31 | 23,000 | 6.7-in. rise, good uniformity, 45–50 cells/inch. |

What is claimed is:

1. A composition of matter selected from the class consisting of (1) block copolymers having the formula:

$R_3SiO(R_2SiO)_nSiR[(OC_kH_{2k})_mOR]_2$ wherein R is a hydrocarbyl radical, $k$ is an integer from 2 to 4 inclusive, $m$ is a number of at least 2, and $n$ is a number having a value of at least 2, and (2) block copolymers having the formula:

$R_3SiO(R_2SiO)_nSiR[OC_kH_{2k})_mOR]_2$ wherein R, $k$, $m$ and $n$ are defined above.

2. A composition of matter of a block copolymer having the formula:

$R_3SiO(R_2SiO)_nSiR[(OC_kH_{2k})_mOR]_2$ wherein R is a hydrocarbyl radical, $k$ is an integer from 2 to 4 inclusive, $m$ is a number of at least 2, and $n$ is a number having a value of at least 2.

3. A composition of matter of a block copolymer having the formula:

$$[RO(C_kH_{2k}O)_m]_2SiRO(R_2SiO)_nSiR[(OC_kH_{2k})_mOR]_2$$

wherein R is a hydrocarbyl radical, k is an integer from 2 to 4 inclusive, m is a number of at least 2, and n is a number having a value of at least 2.

4. A composition of matter of a block copolymer having the approximate formula:

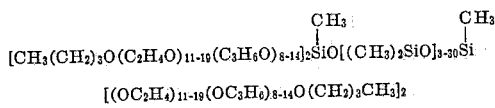

5. A method of preparing a block copolymer containing at least one siloxane polymer and at least one oxyalkylene polymer in combination, which comprises heating at a temperature of from about 75° to about 200° C. (1) an organosilicon polymer containing at least one acyloxy radical attached to a silicon atom having a silicon functionality of from 2 to 4 inclusive and (2) a polyoxyalkylene hydroxyl polymer composed of at least two oxyalkylene groups, and removing a carboxylic acid corresponding to the acyl groups of the siloxane polymer from the reaction mixture.

6. A method of preparing a block copolymer containing at least one siloxane polymer and at least one oxyalkylene polymer in combination, which comprises heating at a temperature of from about 75° to about 200° C. (1) an acyloxy organosilicon polymer selected from the materials having the formulas:

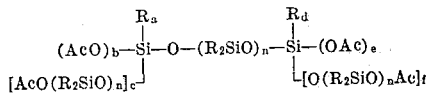

and

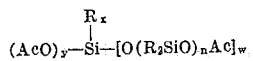

wherein R is a hydrocarbyl radical, Ac is an acyl radical, n is a number having a value of at least 2, a, b, c, d, e and f are 0 or an integer having a value of 1 to 3 inclusive, the sum of $a+b+c$ is 3, the sum of $d+e+f$ is 3 and at least one member of the class consisting of b, c, e and f is an integer having a value of 1 to 3 inclusive, x and y are 0, 1 or 2, w is 2 or 3, and the sum of $x+y+w$ is 4, and (2) a polyoxyalkylene hydroxyl polymer composed of at least two oxyalkylene groups, and removing a carboxylic acid corresponding to the acyl groups of the siloxane polymer from the reaction mixture.

7. A method as claimed in claim 6 wherein the reaction between the acyloxy organosilicon polymer and the polyoxyalkylene hydroxyl polymer to form the block copolymer is conducted in the absence of any catalyst for said reaction.

8. A method as claimed in claim 7 wherein the reaction between the acyloxy organosilicon polymer and the polyoxyalkylene hydroxyl polymer is conducted in the absense of a mutual solvent for said acyloxy organosilicon polymer and said polyoxyalkylene hydroxyl polymer.

9. A method of preparing a block copolymer containing at least one siloxane polymer and at least one oxyalkylene polymer in combination, which comprises heating at a temperature of from about 75° to about 200° C. a siloxane polymer having the formula:

wherein R is a hydrocarbyl radical, Ac is an acyl radical and n is a number having a value of at least 2 and a polyoxyalkylene hydroxyl polymer composed of at least two oxyalkylene groups, and removing a carboxylic acid corresponding to the acyl groups of the siloxane polymer from the reaction mixture.

10. A method of preparing a block copolymer containing at least one siloxane polymer and at least one oxyalkylene polymer in combination, which comprises heating at a temperature of from about 75° to about 200° C. a siloxane polymer having the formula:

$$(AcO)_2SiRO(R_2SiO)_nSiR(OAc)_2$$

wherein R is a hydrocarbyl radical, Ac is an acyl radical and n is a number having a value of at least 2 and a polyoxyalkylene hydroxyl polymer composed of at least two oxyalkylene groups, and removing a carboxylic acid corresponding to the acyl groups of the siloxane polymer from the reaction mixture.

11. A method of preparing a block copolymer containing at least one siloxane polymer and at least one oxyalkylene polymer in combination, which comprises heating at a temperature of from about 75° to about 200° C. a siloxane polymer having the formula:

$$AcO(R_2SiO)_nAc$$

wherein R is a hydrocarbyl radical, Ac is an acyl radical and n is a number having a value of at least 2 and a polyoxyalkylene hydroxyl polymer composed of at least two oxyalkylene groups, and removing a carboxylic acid corresponding to the acyl groups of the siloxane polymer from the reaction mixture.

12. A method of preparing a block copolymer containing at least one siloxane polymer and at least one oxyalkylene polymer in combination, which comprises heating at a temperature of from about 75° to about 200° C. a siloxane polymer having the formula:

$$R_3SiO(R_2SiO)_nAc$$

wherein R is a hydrocarbyl radical, Ac is an acyl radical and n is a number having a value of at least 2 and a polyoxyalkylene hydroxyl polymer composed of at least two oxyalkylene groups, and removing a carboxylic acid corresponding to the acyl groups of the siloxane polymer from the reaction mixture.

13. A method of preparing a block copolymer containing at least one siloxane polymer and at least one oxyalkylene polymer in combination, which comprises heating at a temperature of from about 75° to about 200° C. a siloxane polymer having the formula:

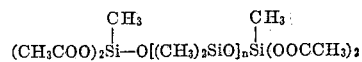

wherein n has a value of about 30 with a first oxyalkylene polymer consisting essentially of a monomethyl ether of a polyethylene glycol having an average molecular weight of about 750 and removing acetic acid from the mixture, said first oxyalkylene polymer being present in the reaction mixture in an amount of about two moles for each mole of siloxane polymer, then heating the block copolymer so produced with a second oxyalkylene polymer consisting essentially of a monobutyl ether of a polyalkylene glycol containing 50 weight percent ethylene oxide units and 50 weight percent propylene oxide units and having an average molecular weight of about 1650 and removing acetic acid from the mixture, said second oxyalkylene polymer being present in the reaction mixture in an amount of about two moles for each mole of siloxane polymer starting material.

$$R_3SiO(R_2SiO)_nSiR(OAc)_2$$

(References on following page)

References Cited

UNITED STATES PATENTS

| | | | |
|---|---|---|---|
| 2,608,495 | 8/1952 | Berry | 260—46.5 |
| 2,834,748 | 5/1958 | Bailey | 260—46.5 |
| 2,910,496 | 10/1959 | Bailey | 260—46.5 |
| 2,917,480 | 12/1959 | Bailey | 260—46.5 |
| 2,990,377 | 6/1961 | May | 260—448.8 |
| 3,035,016 | 5/1952 | Bruner | 260—46.5 |
| 3,194,773 | 7/1965 | Hostettler | 260—448.8 |

FOREIGN PATENTS

| | | |
|---|---|---|
| 148,383 | 9/1952 | Australia. |
| 899,938 | 6/1962 | Great Britain. |
| 73,638 | 9/1960 | France. |
| 1,220,348 | 5/1960 | France. |

OTHER REFERENCES

Zhurnal Obshchei Khimi, vol. T-27, June-September 1957, pp. 2073–2075, relied on, copy in scientific library.

Sprung: Journal of Organic Chemistry, vol. 23, January 1950, pp. 58–64, copy in scientific library.

DONALD E. CZAJA, *Primary Examiner.*

LEON J. BERCOVITZ, *Examiner.*

F. McKELVEY, H. E. TAYLOR, *Assistant Examiners.*

UNITED STATES PATENT OFFICE
CERTIFICATE OF CORRECTION

Patent No. 3,356,758                                    December 5, 1967

George M. Omietanski et al.

It is hereby certified that error appears in the above numbered patent requiring correction and that the said Letters Patent should read as corrected below.

Column 9, line 51, the formula should appear as shown below instead of as in the patent:

$$[(OC_2H_4)_{17}OMe]$$

column 10, line 58, the formula should appear as shown below instead of as in the patent:

$$[RO(C_kH_{2k}O)_m]_2SiRO(R_2SiO)_nSiR[(OC_kH_{2k})_mOR]_2$$

Signed and sealed this 11th day of February 1969.

(SEAL)
Attest:

Edward M. Fletcher, Jr.                                  EDWARD J. BRENNER
Attesting Officer                                            Commissioner of Patents